United States Patent
Yang et al.

(10) Patent No.: US 11,184,196 B1
(45) Date of Patent: Nov. 23, 2021

(54) IMPEDANCE MATCHING SYSTEM FOR HIGH SPEED DIGITAL RECEIVERS

(71) Applicant: OmniVision Technologies, Inc., Santa Clara, CA (US)

(72) Inventors: Li Yang, Fremont, CA (US); Charles Qingle Wu, Palo Alto, CA (US); Nan Liu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/125,605

(22) Filed: Dec. 17, 2020

(51) Int. Cl.
*H04L 25/02* (2006.01)
*H04L 25/08* (2006.01)

(52) U.S. Cl.
CPC ...... *H04L 25/0278* (2013.01); *H04L 25/0274* (2013.01); *H04L 25/0276* (2013.01); *H04L 25/085* (2013.01)

(58) Field of Classification Search
CPC ............. H04L 25/0278; H04L 25/0274; H04L 25/0276; H04L 25/085
See application file for complete search history.

(56) References Cited

U.S. PATENT DOCUMENTS 5,955,911 A * 9/1999 Drost ................ H03H 11/28
327/404

* cited by examiner

*Primary Examiner* — Nader Bolourchi
(74) *Attorney, Agent, or Firm* — Lathrop GPM LLP

(57) ABSTRACT

A digital differential line receiver includes a differential signal to single-ended conversion amplifier coupled to receive a data line and data-complement line of a differential signal; a first termination resistor coupled to the data line of the differential signal; a second termination resistor coupled to the data-complement line of the differential signal; a first impedance-adjusting transistor coupled between the first termination resistor and a common mode line; a second impedance-adjusting transistor coupled between the second termination resistor and the common mode line; a control-voltage generator coupled to sense the common mode line and provide a control voltage, the control voltage generator configured to adjust the control voltage to a voltage level such that a combined impedance of the first termination resistor, the first impedance-adjusting transistor, the second termination resistor, and the second impedance-adjusting transistor matches a specified impedance.

6 Claims, 3 Drawing Sheets

US 11,184,196 B1

IMPEDANCE MATCHING SYSTEM FOR HIGH SPEED DIGITAL RECEIVERS

BACKGROUND

It is well known that impedance mismatches between signal lines, signal receivers, and signal transmitters can cause signal reflections and ringing on the signal lines. Ringing is undesirable because it can cause signals to cross digital signal thresholds at receivers that are detected as extra transitions which can cause data corruption of data or clock signals transferred over the signal lines.

As signal bandwidth increases, and PC board area decreases, it is desirable to provide termination resistors on integrated circuits that send or receive high-speed signals to match signal line impedance. These resistors must match the characteristic impedance of signal line-if they are to prevent reflections and ringing on the signal lines.

As signal bandwidth increases, capacitance at input bondpads of integrated circuits can also pose problems because losses at high frequency are proportionally greater with higher capacitance.

Since process variations make it difficult to provide simple on-chip resistors having values sufficiently close to signal line characteristic impedance to suppress reflections and ringing, in prior systems such on-chip resistors have been designed with multiple legs; their resistance value is tested and the resistors are trimmed by removing or adding zero, one, or more of the multiple legs from the circuit. Each leg of such multipart resistors has an associated parasitic capacitance, limiting leg count if total capacitance is to be kept within limits. With few legs, it can be difficult to match resistance of the on-chip resistors to signal line impedance with sufficient precision.

It is particularly necessary to match termination resistors to signal line impedance when very high-speed signals, such as 4.5 gigabit/second or faster differential signals, are used

SUMMARY

A digital differential receiver includes a differential signal to single-ended conversion amplifier coupled to receive a data line and data-complement line of a differential signal; a first termination resistor coupled to the data line of the differential signal; a second termination resistor coupled to the data-complement line of the differential signal; a first impedance-adjusting transistor coupled between the first termination resistor and a common mode line; a second impedance-adjusting transistor coupled between the second termination resistor and the common mode line; a control-voltage generator coupled to sense the common mode line and provide a control voltage, the control voltage generator configured to adjust the control voltage to a voltage level such that a combined impedance of the first termination resistor, the first impedance-adjusting transistor, the second termination resistor, and the second impedance-adjusting transistor matches a specified impedance.

DETAILED DESCRIPTION OF THE EMBODIMENTS

Figure 1:
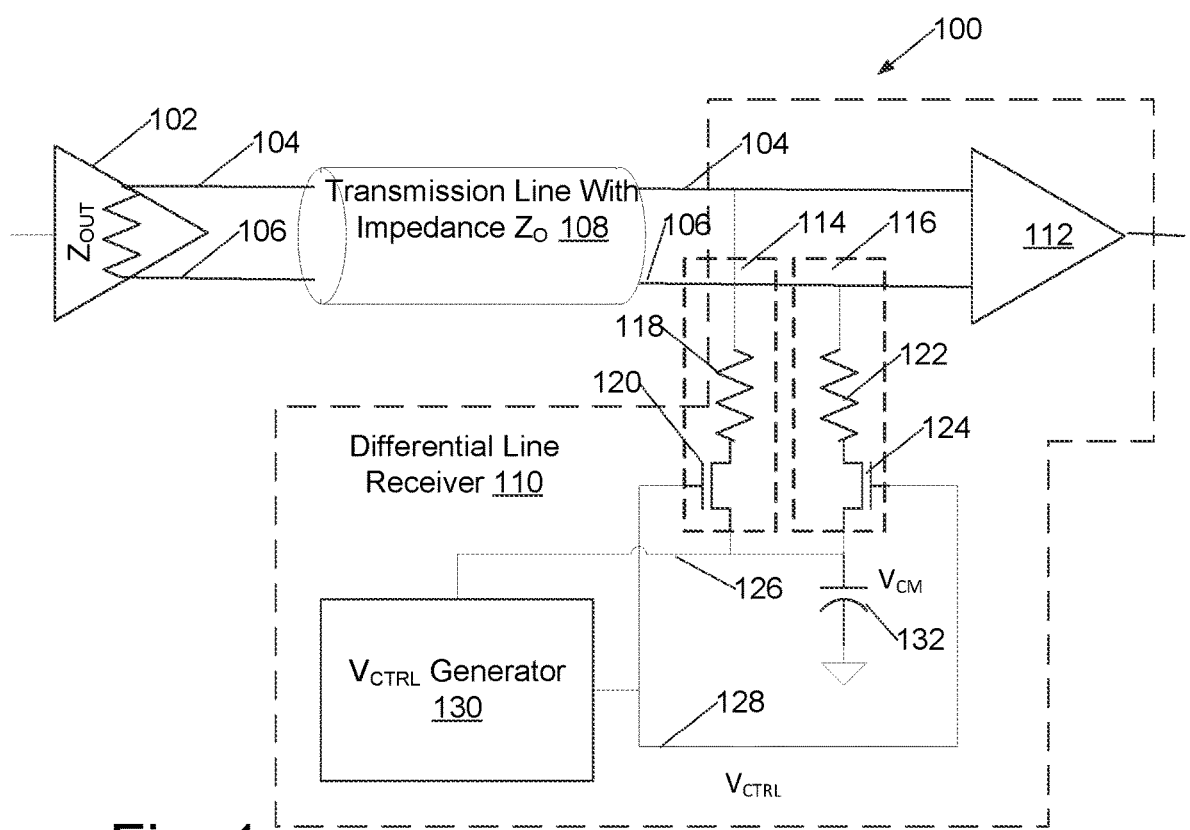
FIG. 1 is a block diagram illustrating a high speed digital communications system employing an active termination.

In a high speed digital communications system 100 (FIG. 1), a transmitter 102, having impedance $Z_{OUT}$ provides a differential signal with true data on signal line 104 and complement data on signal line 106, the signal lines 104, 106 forming conductors of a transmission line 108 that couples to a differential line receiver 110 of an integrated circuit. Differential line receiver 110 includes a differential-to-single-ended converter 112 and first and second termination impedances 114, 116. Termination impedance 114 includes a polysilicon resistor 118 having a value $R_{BASE}$ and a source-drain impedance of a first impedance-adjusting transistor 120, while termination impedance 116 includes a polysilicon resistor 122 of value matching $R_{BASE}$ of polysilicon resistor 118 and a source-drain impedance of a second impedance-adjusting transistor 124; overall impedance of termination impedance 114 and 116 is configured by a control voltage $V_{CTRL}$ 128. First termination impedance 114 couples from true data signal line 104 to a common node 126, while second termination impedance 116 couples from complement data signal line 106 to the common node 126 which has voltage $V_{CM}$. Impedance of the termination impedance impedance-adjusting transistors 120, 124 is controlled by a control voltage $V_{CTRL}$ 128. A control voltage generator 130 receives voltage $V_{CM}$ from common node 126 and provides control voltage $V_{CTRL}$ 128. A filter capacitor 132 may be provided to smooth noise on $V_{CM}$ common node 126. In some embodiments, control voltage generator 130 is common to multiple differential line receivers 110, while termination impedance-adjusting transistors 120, 124, differential-to-single-ended converter 112, and polysilicon resistors 118, 122 are duplicated for each differential line receiver.

$V_{CTRL}$ 128 is adjusted to control total impedance of termination impedance 114 and 116 to match impedance of transmission line 108.

Figure 2:
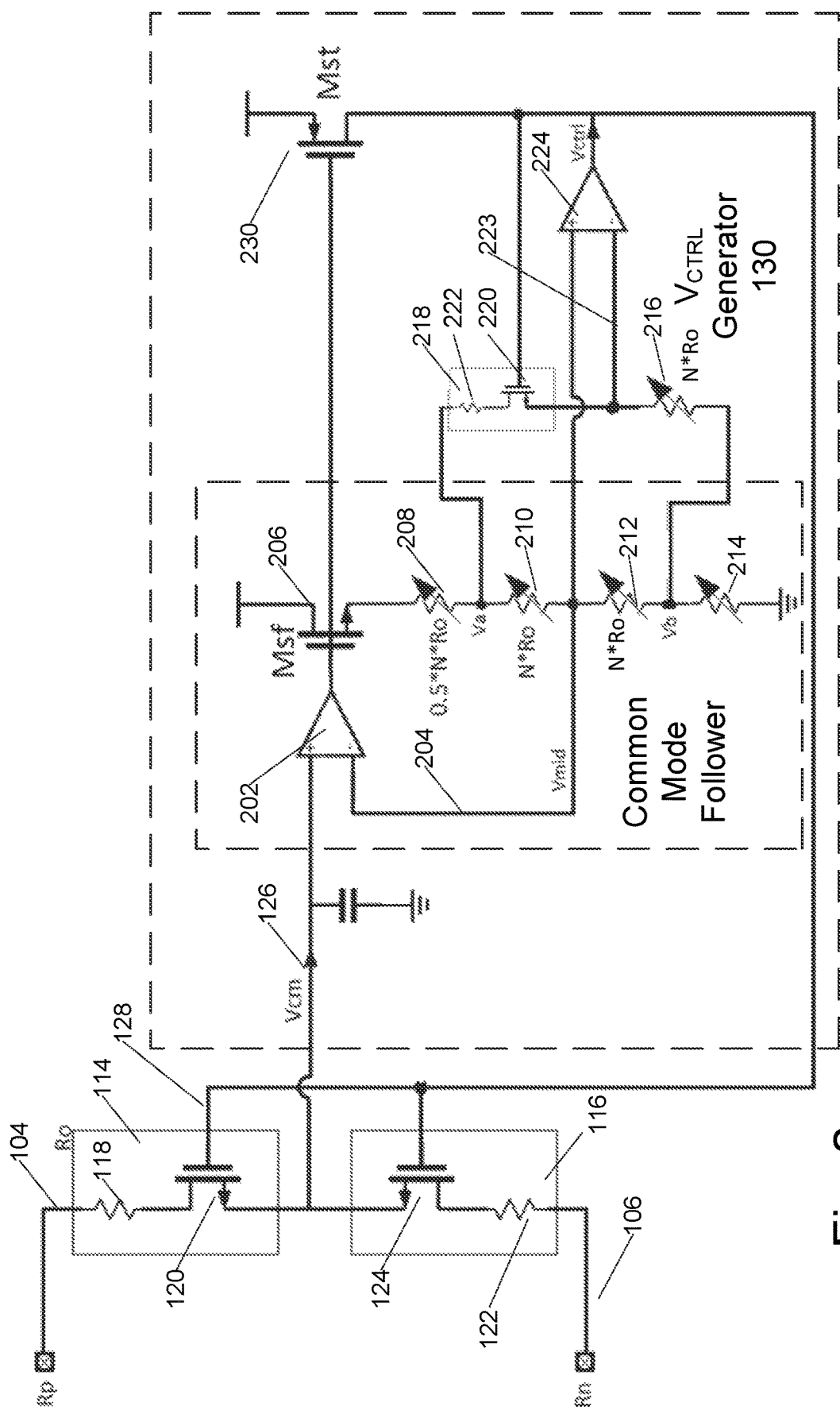
FIG. 2 is a schematic diagram illustrating a receiver for use with the high speed digital communications system of FIG. 1

In a particular embodiment, as illustrated in FIG. 2, the control voltage generator incorporates a differential amplifier 202 that receives $V_{CM}$ from common node 126 on a noninverting input while an inverting input of amplifier 202 is coupled to a midpoint voltage $V_{MID}$ of node 204. Amplifier 202 output drives a reference source follower 206 that drives a reference resistor stack of electronically trimmable resistors 208, 210, 212, 214; while resistors 210, 212 are trimmed to a value of a variable N times a desired impedance of the termination impedances 114, 116, and resistors 208, 214 are trimmed to a value of one half of N times the desired impedance of the termination impedances 114, 116. To reduce power dissipated in the differential line receiver, N is chosen to be greater than one and in embodiments is in the range 2 to 12. In parallel with resistors 210, 212 are a model impedance 218 in series with another electronically trimmable resistor 216, a node 223 coupled to both model impedance 218 and trimmable resistor 216 has a voltage $V_{CMTUNE}$. Model impedance 218 is formed of a polysilicon resistor 222 in series with a transistor 220. Polysilicon resistor 222 has resistance N times resistance of each of the polysilicon resistors 118, 122 of termination impedances 114, 116. Transistor 220 is ratioed with width 1/N times a width of termination impedance-adjusting transistors 120, 124 of termination impedances 114, 116 and the same channel lengths of transistors 120, 124. To accurately model the termination impedances 114, 116, electronically trimmable resistor 216 is also trimmed to N times the desired impedance of the termination impedances 114, 116.

Differential amplifier 202 acts through source-follower 206 to maintain voltage $V_{MID}$ of node 204 at a common mode input voltage of the differential input signals 104, 106.

In an alternative embodiment, resistors 210, 212 of the reference resistor stack are matched by careful attention to layout, resistors 208, 210, 212, 214 are not electronically trimmable, but resistor 216 is electronically trimmable as heretofore described. In another alternative embodiment one, but not both, of resistors 210, 212 are electronically trimmable.

Model impedance 218 and resistor 216 couple to a noninverting input of a second differential amplifier 224 that produces the control voltage $V_{CTRL}$ 128, control voltage $V_{CTRL}$ also couples to a gate of transistor 220 of model impedance 218. Differential amplifier 224 essentially adjusts control voltage $V_{CTRL}$ to force impedance of model impedance 218 to be N times the desired impedance of the termination impedances 114, 116, so model impedance 218 matches resistance of trimmable resistor 216. Since the termination impedances 114, 116 include ratioed transistors and resistors, $V_{CTRL}$ also controls termination impedances 114, 116 to have impedance of 1/N times resistance of trimmable resistor 216 and thereby have impedance matching impedance of transmission line 108.

Figure 3:
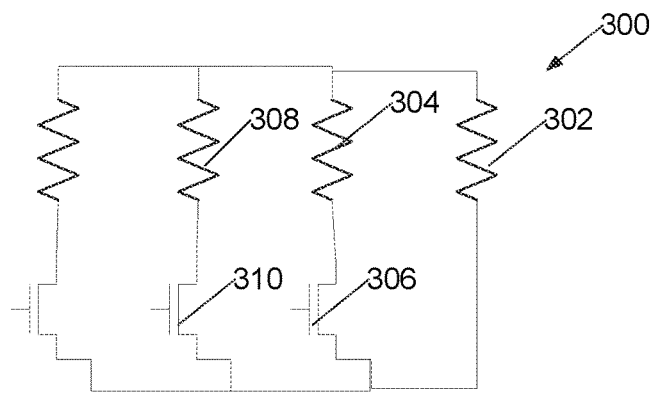
FIG. 3 is a schematic diagram illustrating how individual resistors of the control voltage generator may be formed of multiple individual resistance legs with switching transistors so that the overall resistance value of each resistor may be adjusted.

In embodiments, trimmable resistors 208, 210, 212, 214, 216 are adjustable polysilicon resistors. In particular embodiments, these polysilicon resistors 300 (FIG. 3) each are formed of multiple legs, such as resistance legs 302, 304, 308 where most or all of the resistance legs each have a switching transistor 306, 310 in series with the resistance leg as illustrated in FIG. 3, the legs may be selectively coupled in parallel by turning on zero, one, or more switching transistors 306, 310 according to a resistance adjustment configuration. In particular embodiments, the resistance adjustment configuration for each trimmable resistor is determined during testing of each individual integrated circuit and is programmed into the integrated circuit. Since trimmable resistors 208, 210, 212, 214, 216 are not directly connected to bond pads of the integrated circuit, they and their switching transistors may be laid out according to internal design rules and need not comply with the electrostatic discharge design rules associated with bond pads; the trimmable resistors may therefore be laid out in considerably less area on the integrated circuit than would be required if similarly trimmable resistors were used as termination impedances directly coupled to input bondpads of the integrated circuit to directly couple to and receive differential signals 104, 106. This reduces parasitic capacitance on bond pad and thereby improves termination impedance at high frequency over receivers with impedance adjusted by electronically trimming resistors 118, 122 without providing impedance-adjusting transistors 120, 124.

In some embodiments where fast recovery from a low-power shutdown state of the differential line receiver is required, a boost transistor 230 (FIG. 2) is provided, in particular embodiments boost transistor 230 is switched into the circuit only briefly when recovery from low-power shutdown is required.

Figure 4:
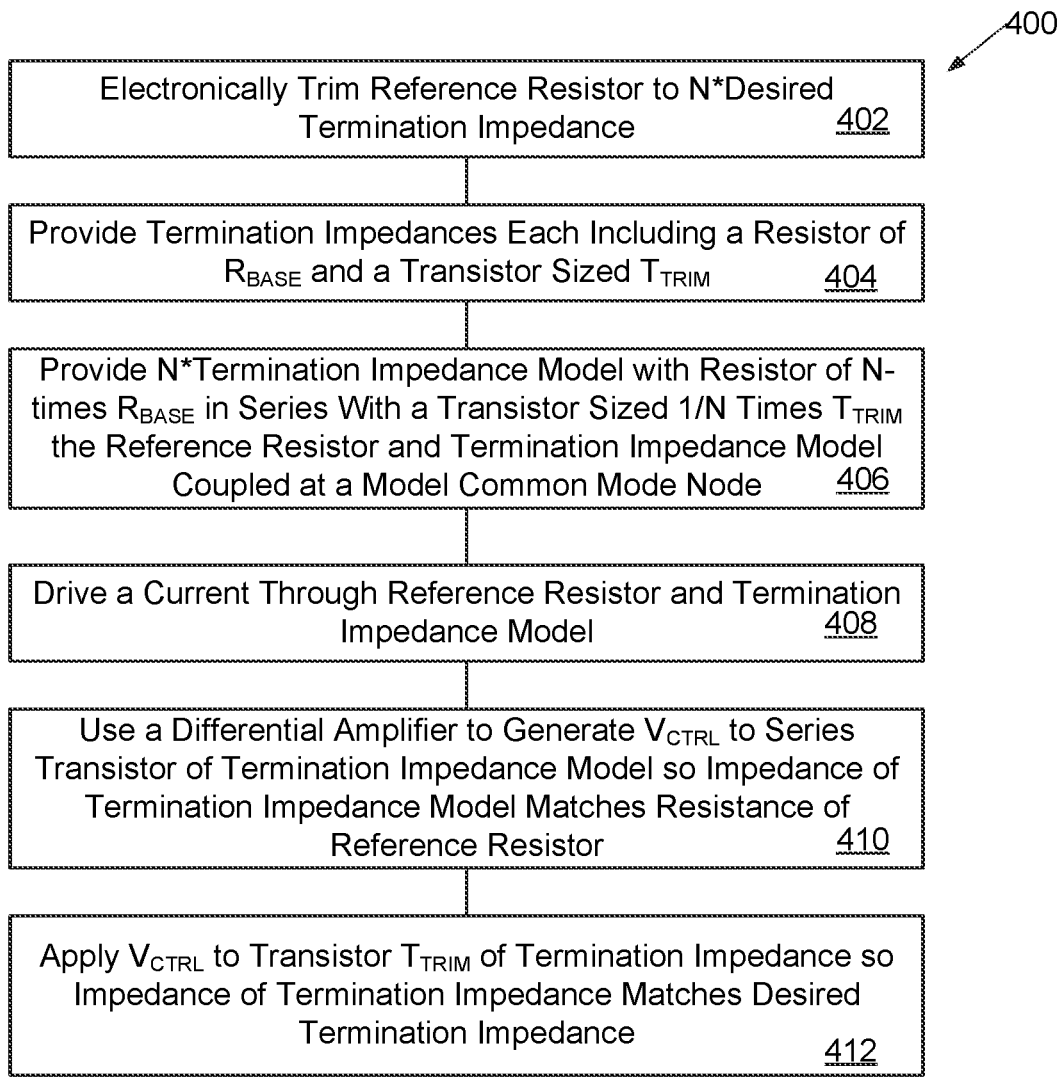
FIG. 4 is a flowchart illustrating a method of controlling on-chip termination impedances of a differential line.

The termination impedances are operated according to a method 400 illustrated in FIG. 4. This method begins by electronically trimming 402 a reference resistor 216 to N times a desired termination impedance, where N is a number. The method includes providing 404 termination impedances 114, 116, each including a resistor 118, 122 of value $R_{BASE}$ and a termination impedance-adjusting transistor 120, 124 sized with width $T_{TRIM}$, the resistor and termination impedance-adjusting transistor coupled in series, and providing 406 an N times termination impedance model 218 comprising a resistor 222 of N-times $R_{BASE}$ in series with a transistor 220 having width 1/N times $T_{TRIM}$, with the reference resistor 216 and N times impedance model 218 being coupled in series at a model common mode node 223.

The method includes driving 408 a current through the reference resistor 216 and the termination impedance model 218; and using 410 a differential amplifier 224 to generate a control voltage that is applied to the transistor 220 of the termination impedance model 218 so impedance of termination impedance model 218 matches resistance of the reference resistor 216; and applying 412 the control voltage to the termination impedance-adjusting transistors 120, 124 of the termination impedances 114, 116.

Combinations

A digital differential line receiver designated A includes a differential signal to single-ended conversion amplifier coupled to receive a data line and data-complement line of a differential signal; a first termination resistor coupled to the data line of the differential signal; a second termination resistor coupled to the data-complement line of the differential signal; a first impedance-adjusting transistor coupled between the first termination resistor and a common mode line; a second impedance-adjusting transistor coupled between the second termination resistor and the common mode line; a control-voltage generator coupled to sense the common mode line and provide a control voltage, the control voltage generator configured to adjust the control voltage to a voltage level such that a combined impedance of the first termination resistor, the first impedance-adjusting transistor, the second termination resistor, and the second impedance-adjusting transistor matches a specified impedance.

A digital differential line receiver designated AA including the digital differential line receiver designated A wherein the specified impedance is a characteristic impedance of a transmission line providing the data line and the data complement line to the digital differential line receiver.

A digital differential line receiver designated AB including the digital differential line receiver designated A or AB wherein a combined impedance of the first termination resistor and the second termination resistor is at least eighty percent of the combined impedance of the first termination resistor, the first impedance-adjusting transistor, the second termination resistor, and the second impedance-adjusting transistor.

A digital differential line receiver designated AC including the digital differential line receiver designated A, AA, or AB wherein the control voltage generator comprises a trimmable resistor and a reference impedance further comprising a reference impedance resistor having resistance a number N times a resistance of the first termination resistor, and a reference impedance transistor having a width 1/N times a width of the first impedance-adjusting transistor; a node coupled to the reference impedance and the trimmable resistor being coupled to a inverting input of a differential amplifier coupled to provide the control voltage, and a noninverting input of the differential amplifier coupled to a voltage matching a common mode voltage of the differential signal.

A method of adjusting impedance at inputs of a differential line receiver designated B includes electronically trimming a reference resistor; providing termination impedances each including a resistor and a termination impedance-adjusting transistor, the resistor and termination impedance-adjusting transistor coupled in series; provide a termination impedance model comprising a resistor in series with a transistor, the reference resistor and impedance model being coupled in series at a model common mode node; driving a current through the reference resistor and the termination impedance model; using a differential amplifier to generate a control voltage applied to the transistor of the termination impedance model so impedance of termination impedance model matches resistance of reference resistor; and applying the control voltage to the termination impedance-adjusting transistors of the termination impedances.

A method of adjusting impedance at inputs of a differential line receiver designated BA including the method designated B wherein the reference resistor is trimmed to a resistance N times a desired impedance of the termination impedances, where N is a number; where the resistors of each termination impedance has value $R_{BASE}$ a value less than the desired impedance of the termination impedances, and where the resistor of the termination impedance model has value N times $R_{BASE}$, where the impedance-adjusting transistor of each termination impedance has width $T_{TRIM}$, and the transistor of the termination impedance model has width $T_{TRIM}/N$.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A digital differential line receiver adapted to receive a data line and a data-complement line of a differential signal comprising:
   a differential signal to single-ended conversion amplifier coupled to receive the data line and the data-complement line of the differential signal;
   a first termination resistor coupled to the data line of the differential signal;
   a second termination resistor coupled to the data-complement line of the differential signal;
   a first impedance-adjusting transistor coupled between the first termination resistor and a common mode line;
   a second impedance-adjusting transistor coupled between the second termination resistor and the common mode line;
   a control-voltage generator coupled to sense the common mode line and provide a control voltage, the control voltage generator configured to adjust the control voltage to a voltage level such that a combined impedance of the first termination resistor, the first impedance-adjusting transistor, the second termination resistor, and the second impedance-adjusting transistor matches a specified impedance.

2. The digital differential line receiver of claim 1 wherein the specified impedance is a characteristic impedance of a transmission line providing the data line and the data complement line to the digital differential line receiver.

3. The digital differential line receiver of claim 1 wherein a combined impedance of the first termination resistor and the second termination resistor is at least eighty percent of the combined impedance of the first termination resistor, the first impedance-adjusting transistor, the second termination resistor, and the second impedance-adjusting transistor.

4. The digital differential line receiver of claim 1 wherein the control voltage generator comprises a trimmable resistor and a reference impedance further comprising a reference impedance resistor having resistance a number N times a resistance of the first termination resistor, and a reference impedance transistor having a width 1/N times a width of the first impedance-adjusting transistor; a node coupled to the reference impedance and the trimmable resistor being coupled to a inverting input of a differential amplifier coupled to provide the control voltage, and a noninverting input of the differential amplifier coupled to a voltage matching a common mode voltage of the differential signal.

5. A method of adjusting impedance at inputs of a differential line receiver comprising:
   electronically trimming a reference resistor;
   providing termination impedances each comprising a resistor and an impedance-adjusting transistor, the resistor and impedance-adjusting transistor coupled in series;
   provide a termination impedance model comprising a resistor in series with a transistor, the reference resistor and the termination impedance model being coupled in series at a model common mode node;
   driving a current through the reference resistor and the termination impedance model;
   using a differential amplifier to generate a control voltage applied to the transistor of the termination impedance model so impedance of termination impedance model matches resistance of the reference resistor; and
   applying the control voltage to the impedance-adjusting transistor of the termination impedances.

6. The method of claim 5 wherein the reference resistor is trimmed to a resistance N times a desired impedance of the termination impedances, where N is a number; where the resistors of each of the termination impedances has value $R_{BASE}$ a value less than the desired impedance of each of the termination impedances, and where the resistor of the termination impedance model has value N times $R_{BASE}$, where the impedance-adjusting transistor of each termination impedance has width $T_{TRIM}$, and the transistor of the termination impedance model has width $T_{TRIM}/N$.

* * * * *